Inventor:
Robert R. Seedorf
By
Hofgren, Wegner,
Allen, Stellman & McCord Atty's

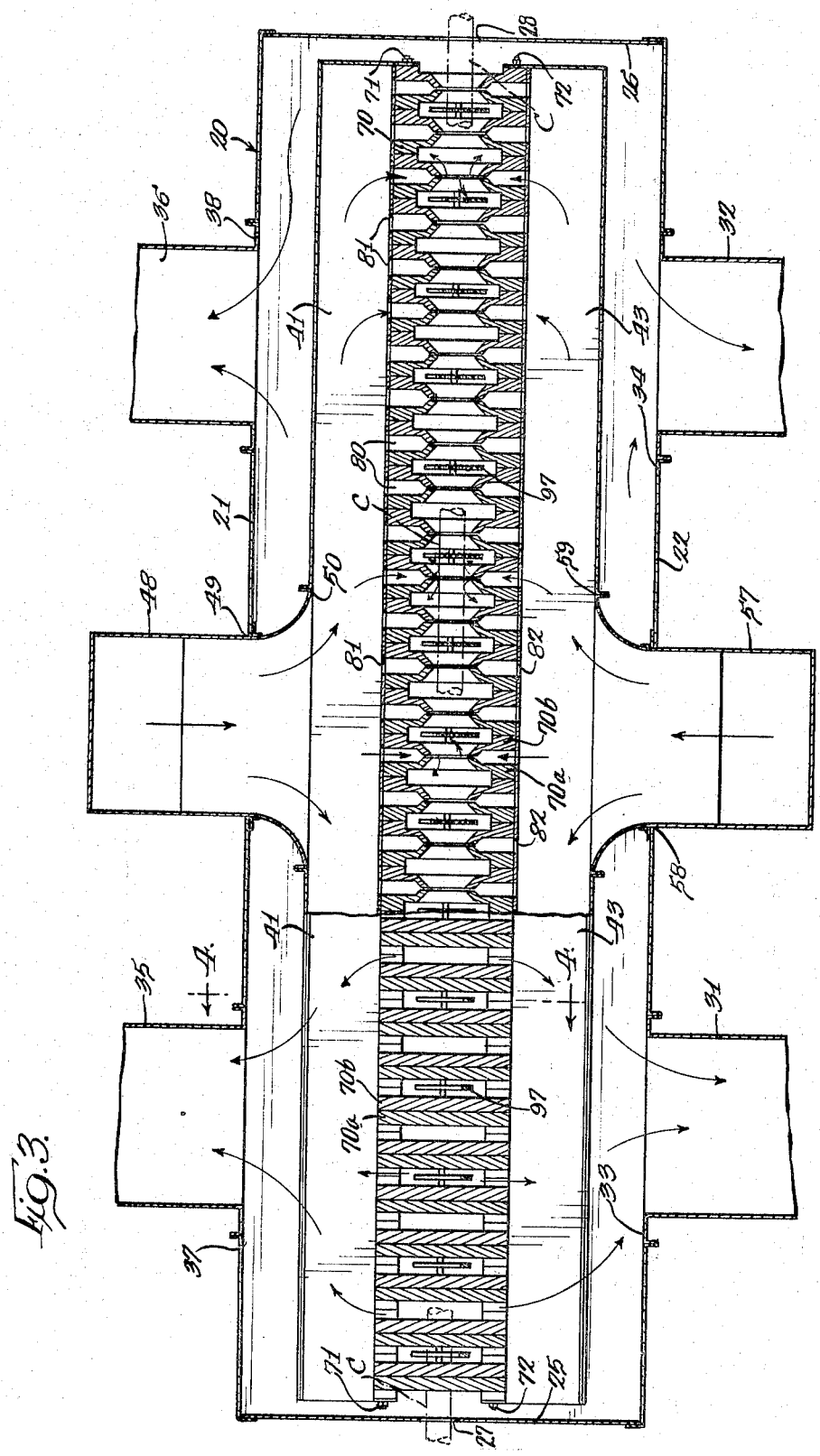

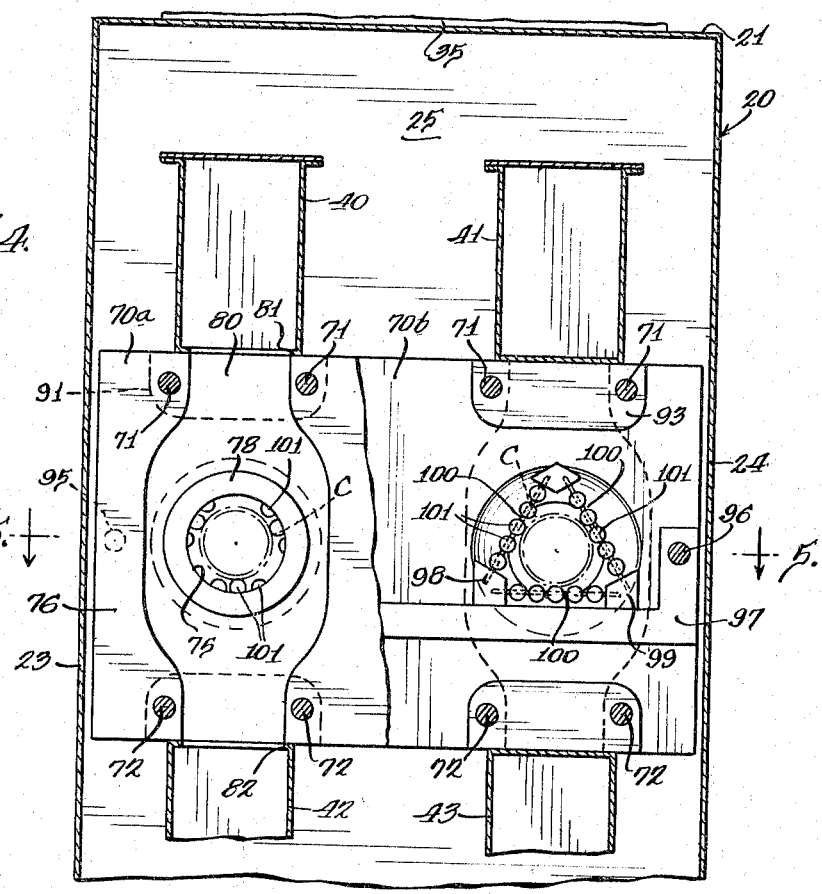

United States Patent Office 3,321,844
Patented May 30, 1967

3,321,844
HEAT TRANSFER DEVICE FOR TUBULAR MATERIAL
Robert R. Seedorf, Deerfield, Ill., assignor to The Roy M. Moffitt Company, a corporation of Illinois
Filed Aug. 31, 1964, Ser. No. 393,824
11 Claims. (Cl. 34—160)

This invention relates to a heat transfer device and, more particularly, to a heat transfer device for causing impingement of a fluid, such as heated or refrigerated air, at a high velocity against the entire surface of a tubular material for drying, freezing, or other treatment thereof.

One object of this invention is to provide a heat transfer device for treating tubular products in which high velocity heat transfer fluid is projected against the entire periphery of the tubular product as it is moved through the device.

Another object of this invention is to provide a heat transfer device, such as a high velocity drying unit, for obtaining impingement of high velocity air against the entire surface of a product to be dried in order to obtain controlled maximum drying per length of drying unit with substantial economies being effected both by the construction of the dryer and the minimum space required for the drying unit.

Still another object of the invention is to provide a dryer for taubular material, such as synthetic casings, which are to be dried after formation thereof by passing the casing along a path of travel and having a series of generally annular orifices surrounding and spaced along the path, each orifice being in fluid communication with high pressure air whereby the air is converted to a high velocity for impingement upon the surface of the casing about the entire periphery thereof to obtain maximum and uniform drying.

A further object of the invention is to provide a drying unit, as defined in the preceding paragraph, in which a series of similarly constructed blocks are formed to be arranged in pairs with face portions of adjacent blocks together defining the annular orifice and with additional formed parts of the blocks defining an air passage leading to the outer periphery of the annular orifice for supplying air thereto, with a block of one pair being in spaced relation from the adjacent block of another pair to provide for exhaust of air from around the casing, and means holding the blocks in assembled stacked relation.

Still another object of this invention is to provide an improved process for exchanging heat with a tubular product by projecting a high velocity heat exchange fluid against the entire periphery of the product as it is moved past one or more jets or orifices from which the heat exchange fluid is projected.

Further objects and advantages will become apparent from the following detailed description taken in connection with the accompanying drawings in which:

FIG. 3 is a vertical section on an enlarged scale taken generally along the line 3—3 in FIG. 2 (except that the left end portion of FIG. 3 is taken along a section line offset from the remainder of the figure and lying between the air inlet manifold and the outer wall of the heater) and with parts of the tubular material to be dried shown in broken line;

FIG. 4 is a vertical section taken generally along the line 4—4 in FIG. 3 and with a part of one drying block broken away and a tubular member to be dried shown in broken line; and FIG. 5 is a plan section, taken generally along the line 5—5 in FIG. 4 with the tubular member to be dried shown in broken line.

Figure 1:
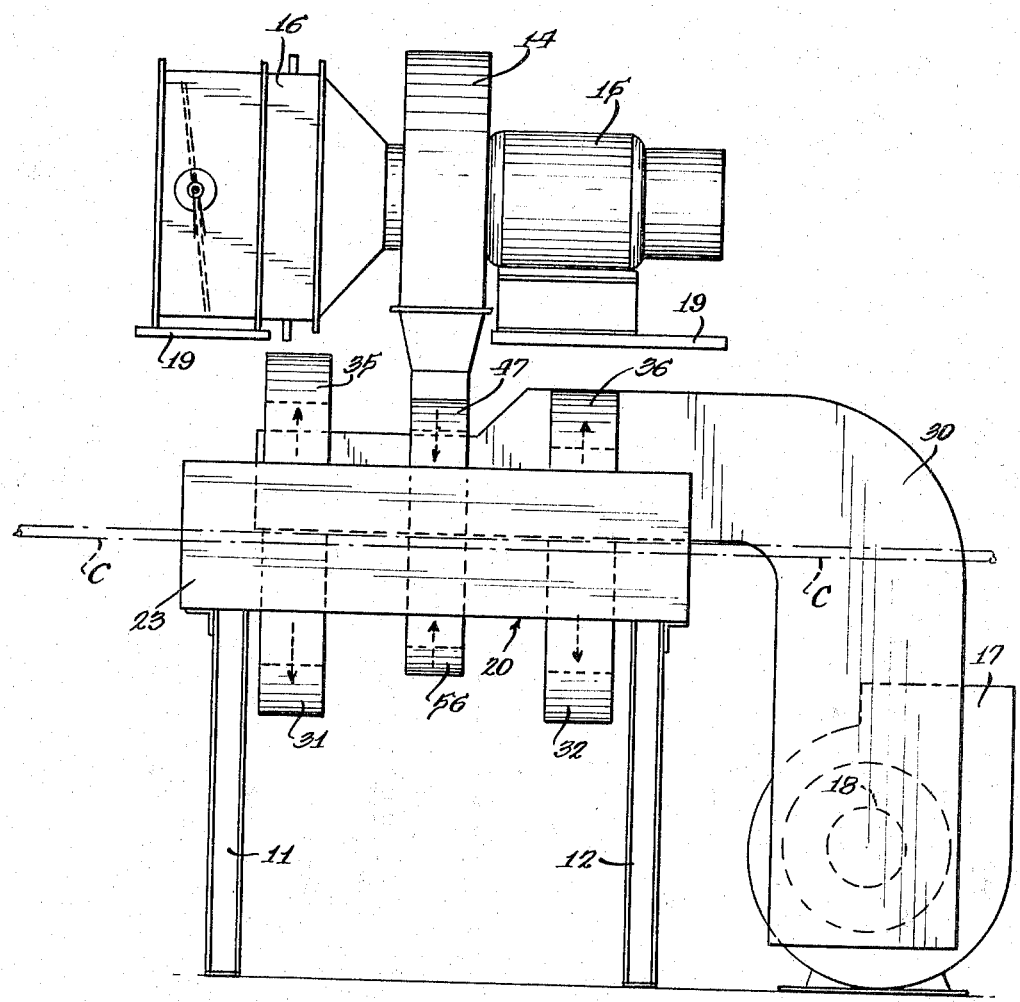
FIG. 1 is a front elevational view of the dryer.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The heat transfer unit as disclosed herein is shown as utilized for drying a tubular member. This can be either for drying a surface coating, the wall of the member, or applying or removing heat from material within the member. The unit embodies a supporting framework including supporting legs 11 and 12 mounting a framework 13. A blower 14 driven by a motor 15 draws air through an air heater 16 for supply to the drying section. A separate support 19 is provided for the motor and air heater. A blower 17 driven by a motor 18 exhausts air from the drying section.

The drying section embodies an enclosing housing, indicated generally at 20, and having top and bottom walls 21 and 22, respectively, connected to side walls 23 and 24 and end walls 25 and 26 to define a generally box-like casing. The end wall 25 has two laterally-spaced openings 27 and the end wall has two openings 28 for passage of a pair of spaced-apart tubular members C through the housing. As mentioned above, these members C can be synthetic casing, e.g., sausage casings of regenerated cellulose, cellulose derivatives, alginates, amylose, etc.

Figure 2:
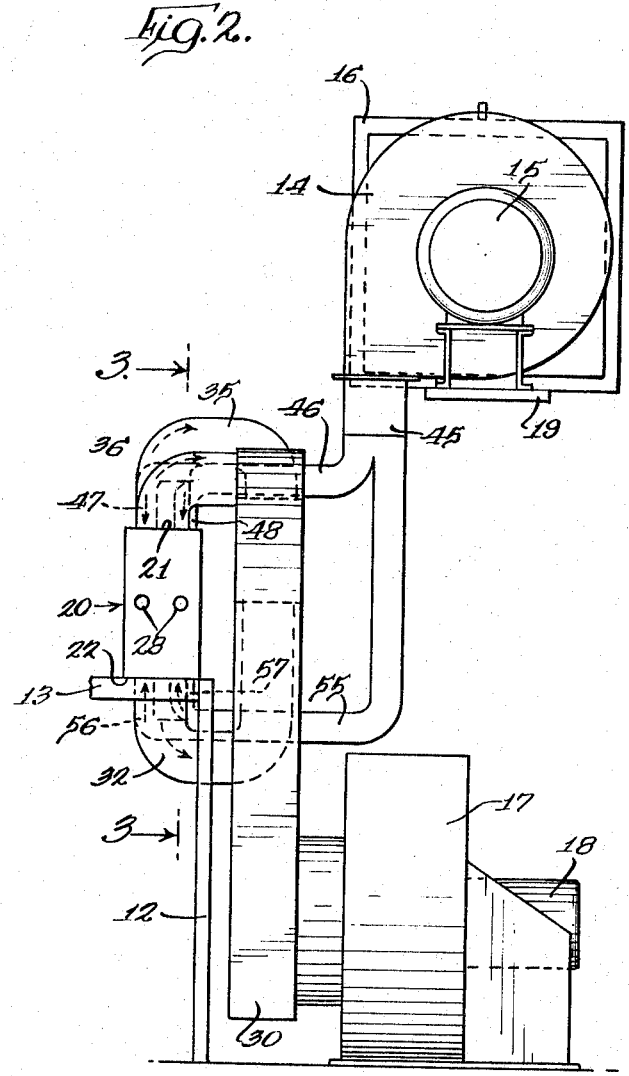
FIG. 2 is an end elevational view of the dryer, looking toward the right-hand end of FIG. 1.

Air utilized in drying is withdrawn from within the housing by means of the blower 17, previously referred to, which connects by a main duct 30 with ducts 31 and 32 extending from openings 33 and 34, respectively, in the bottom wall 22 of the housing and also from ducts 35 and 36 connecting with openings 37 and 38, respectively, in the top wall 21 of the housing 20. This exhaust air flow is shown by arrows in FIGS. 1, 2 and 3.

Air, under high pressure, is supplied to a series of manifolds located within the housing and sealed off from communication therewith. These manifolds are shown particularly in FIGS. 3 and 4, with there being a pair of laterally-spaced upper manifolds 40 and 41 and laterally-spaced lower manifolds 42 and 43.

The upper manifolds 40 and 41 are supplied with pressure air from a main supply duct 45 by a branch duct 46 which separates into a pair of spaced ducts 47 and 48, which connect with the manifolds 40 and 41, respectively. As shown in FIG. 3, the duct 48 passes through an opening 49 in the housing top wall 21 to connect with an opening 50 in the manifold 41 whereby air is delivered into the manifold as shown by the arrows in FIGS. 1, 2 and 3.

Air under pressure is also supplied to the lower manifolds 42 and 43 by a branch duct 55 connected with the main duct 45 and having a pair of laterally-spaced ducts 56 and 57 which connect with the manifolds 42 and 43, respectively. As shown in FIG. 3, the duct 57 passes through an opening 58 in the bottom wall 22 of the housing 20, and connects with an opening 59 in the manifold 43, with there being a similar connection of duct 56 to the manifold 42.

The drying section embodies two series of annular, high velocity air orifices spaced along the path of travel of two tubular members C, such as synthetic casing. These casings are shown in broken line in several of the views. The drying section is constructed to handle two casings, although the structure for handling one casing will be described in detail and the description will apply to both.

The casing C enters through one dryer casing opening 28, as viewed in FIG. 3 and travels from right to left, although travel can be in either direction.

The drying section is made up of a series of identical blocks 70 which are arranged in pairs and held together by means of two series of tie bolts, with an upper row of bolts 71 and a lower row of bolts 72 extending for the entire length of the drying section.

Each of the blocks 70 is generally planar in construction, with an adjacent pair being shown in FIG. 5 in transverse section. For purposes of description, these two blocks are identified as 70a and 70b. The block 70a has an opening 75 with a surface 76 arranged adjacent to a corresponding surface 77 of block 70b and, in fact, in engagement therewith to provide one pair of blocks. The opening 75 has a surrounding face 78, annular in shape, and set back from the surface 76 whereby the association of the pair of blocks results in adjacent faces defining an annular orifice for directing air radially of the material path of travel. The block 70a has a channel 80 extending from top to bottom thereof and across the entire height of the block to communicate with the manifolds 40 and 42 through openings 81 and 82, respectively, in the manifolds. A series of these openings are spaced along the length of the manifold to correspond to the location of the block channels and to prevent fluid communication with exhaust air spaces subsequently to be described.

A pair of the channels 80 in adjacent blocks define a high pressure air chamber completely surrounding the annular orifice to supply the entire orifice with air. As seen in FIG. 4, the channel 80 has a width greater than that of the orifice diameter to include the orifice within its dimensions. The opening 75 is defined in part by a sloped wall 85 and this sloped wall, along with the length of the orifice slot defined by the faces 78 of adjacent blocks, provides for parallel, non-turbulent air stream flow from the orifice.

The opposite surface face 90 of a block 70 has laterally-spaced lower lugs 91 and 92 and upper, laterally-spaced lugs, one of which is indicated at 93 in FIG. 4, to engage corresponding lugs of an adjacent block 70 and space apart the pairs of blocks. This spacing of pairs of blocks defines exhaust air passages between adjacent annular orifices, whereby the exhaust air can pass to the interior of the housing 20 and be withdrawn by the blower 17 through the exhaust duct 30 and branch ducts leading from the casing.

In addition to the tie bolts 71 and 72, dowel pins 95 and 96 are provided to align adjacent blocks 70 and these pins are used to support a guide mounting 97. This guide mounting 97 extends across the width of the drying section and mounts guides, each having a pair of blocks 98 and 99 which support three rods 100 arranged triangularly and each carrying a plurality of rotatable balls 101 to define a guide path for the tubular casing C. In actual operation, it has been found that an unbalance in static pressure conditions surrounding the tubular casing C can result in drawing the casing against the edge of an orifice and the guides provide controlled guiding of the casing C through the drying section. In effect, a three-point guiding is provided and the balls can be of nylon or the like for limited friction in rotation.

In a typical operation, the casing C is inflated under a slight air pressure to generally maintain its shape as it passes through the drying section at a rate of approximately 100'/minute. Air at a temperature of 250° F. is supplied through the pressure manifolds to the annular orifices at a pressure sufficient to produce an air flow of 16,000 to 18,000 feet per minute in the area around the synthetic casing C, although this velocity is only intended as an example and not to be limiting. In an actual structure, the orifice slot is .040 inch in width, one-quarter of an inch long, and 1⅜ inch in diameter, with the casing C having a ⅞ inch inflated diameter. The guide balls 101 define a guide path having a diameter of 1 inch. The supply of the air from the manifolds to the orifices occurs at spaced points along the drying section, with the air being promptly exhausted by the spaces provided between adjacent pairs of drying blocks. With this structure, high velocity air is impinged upon the casing C about the entire periphery thereof and generally radially of the casing axis. This produces a controlled, uniform drying of the casing and rapid drying in minimum space by the high velocity air actually scrubbing-away a micro-thin moisture layer as the air is delivered from the orifices close to the entire periphery of the casing.

Although specifically disclosed as a dryer, the heat transfer device has applications in other fields and can be used for cooking, smoking, or freezing food products in a tubular casing. In such applications, air at a cooking temperature, or smoke, or refrigerated air would be supplied through the orifices to effect the desired treatment.

While this invention has been described with special emphasis upon the drying apparatus, it should be noted that the apparatus is used in carrying out a novel heat transfer process. This process preferably uses the described apparatus to heat or cool a tubular product. However, the process can be carried out by any suitable arrangement of air jets or orifices which impinge a high velocity stream of air circumferentially about the entire periphery of a tubular product as the product moves past the air jets.

I claim:
1. A heat transfer unit for tubular material comprising, an enclosed housing with an opening at opposite ends thereof to permit travel of the material through the casing along a path, means in the housing for impinging high velocity air on the tubular material comprising, a series of blocks assembled in a row along the path of travel, means formed on adjacent pairs of blocks defining an annular orifice therebetween and substantially normal to said path, means formed on each adjacent pair of blocks defining an air passage extending through said pair of blocks normal to said path and surrounding said orifice for supplying air to said orifice about the entire outer periphery thereof, manifold means within the housing extending along the row of blocks and in fluid communication with the end of said air passages and closing said air passages off from communication with the casing interior, means for supplying air under high pressure to said manifold means for delivery through said orifices at high velocity to impinge against said material, and means for exhausting air from around said material including low pressure air passages in communication with said housing.

2. A unit as defined in claim 1 in which said blocks are held in assembled relation by tie bolts extending therethrough.

3. A unit as defined in claim 1 in which guide means are provided along the material path intermediate a pair of orifices to guide the material along said path.

4. A drying unit as defined in claim 3 for flexible tubular material in which said guide means comprises a triangular frame with rotatable members defining said path, and a mounting for said frame connected to adjacent blocks.

5. A heat transfer unit for transfer of heat relative to tubular material traveling along a path comprising, a series of assembled apertured blocks defining a central opening for said path, a series of annular orifices surrounding said path and located in spaced relation along said path by the assembly of said blocks, each of said orifices pointing directly toward said path and having a narrow throat and short depth, said assembled blocks providing spaced high pressure air chambers completely surrounding the radially outward end of each orifice to supply high pressure air in large volume to each orifice, each chamber having a volume many times greater than that of the orifice whereby the airflow increases to a high velocity in the orifice for impingement on said tubular material with minimum resistance to airflow because of the short depth of the orifice, and exhaust passageways located in spaced relation by said assembled blocks and positioned one intermediate each of said orifices to exhaust air after impingement on said tubular material.

6. A heat transfer unit as defined in claim 5 wherein each of said high pressure air chambers is open at opposite ends and including manifolds connected to both open ends for supplying high pressure air in large volume without substantial restriction to said chambers.

7. A heat transfer unit for transfer of heat relative to tubular material traveling along a path by impingement of high velocity air against the material generally normal to the surface thereof and around the entire periphery of the material comprising, a series of air impingement units spaced along the length of said path, each of said units having a high pressure air chamber for receiving a large volume of air, and an annular orifice disposed within said chamber having a radially outward inlet end exposed to said chamber about the entire periphery thereof and an inner air discharge outlet completely surrounding said path, said orifice having an orifice opening of a width of approximately .040″ and a length of approximately .20″ whereby air flow is increased in the orifice to a high velocity in the neighborhood of 16,000 feet per minute to impinge on the material with minimum air travel at high velocity in the orifice to minimize resistance to air flow, and exhaust passage means in said body intermediate each orifice to exhaust the air after impingement on the material.

8. A heat transfer unit as defined in claim 7, wherein the tubular material is flexible, including a series of guide means along said path for guiding of the material each having a triangular frame with rotatable members enclosing the entire path to guide the material in any position thereof.

9. In a high velocity drying unit, a series of identical blocks held in assembled relation to define a series of annular orifices spaced-apart along the path of travel of a tubular material to be dried, each of said blocks having a generally planar body with a central opening therethrough, an annular face surrounding said opening and set back from one surface of said block, said annular face lying in a plane generally normal to the axis of said central opening, a channel recessed in said one surface having a portion of a width sufficient to surround said opening and said annular face and extending across an entire dimension of the surface; said blocks being assembled in pairs with said one surface of a block in each pair juxtaposed to said one surface of the other block in each pair, said annular faces in each pair of blocks being aligned and spaced to define one of said annular orifices, and the channels in each pair of blocks being aligned to define high pressure air chambers for supplying air to said orifices about the entire periphery thereof.

10. A unit as defined in claim 9 in which each block has a surface opposite said one surface with raised lugs positioned to engage corresponding lugs of an adjacent block and space apart said pairs of blocks to provide space therebetween for exhaustion of air.

11. A unit as defined in claim 9 in which each of said annular faces has a width sufficient to provide an orifice slot of a depth to obtain a parallel, non-turbulent air flow.

References Cited
UNITED STATES PATENTS 2,009,078   7/1935   Ziska _____ 34—160 X

FOREIGN PATENTS 706,518   5/1941   Germany.

FREDERICK L. MATTESON, JR., *Primary Examiner.*

A. D. HERRMANN, *Assistant Examiner.*